(12) United States Patent
Weiler et al.

(10) Patent No.: US 7,525,744 B2
(45) Date of Patent: Apr. 28, 2009

(54) FOCUSING DRIVE

(75) Inventors: Andreas Weiler, Altstaetten (CH);
Daniel Kuster, Heerbrugg (CH);
Thorsten Ebenhoch, Leutkirch (DE)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 9 days.

(21) Appl. No.: 11/842,714

(22) Filed: Aug. 21, 2007

(65) Prior Publication Data

US 2008/0055750 A1    Mar. 6, 2008

(30) Foreign Application Priority Data

Aug. 31, 2006    (DE) ............... 10 2006 040 797

(51) Int. Cl.
*G02B 7/02* (2006.01)
(52) U.S. Cl. .................................... 359/823; 359/824
(58) Field of Classification Search ................. 359/694, 359/696, 822, 823, 828, 738–740
See application file for complete search history.

(56) References Cited

U.S. PATENT DOCUMENTS

| | | | |
|---|---|---|---|
| 4,679,976 A | 7/1987 | Narishige et al. ............ | 414/4 |
| 5,763,965 A | 6/1998 | Bader ........................ | 310/12 |
| 6,292,313 B1 * | 9/2001 | Kanayama et al. .......... | 359/823 |
| 6,919,999 B2 * | 7/2005 | Watts ........................ | 359/823 |

FOREIGN PATENT DOCUMENTS

DE    19833904 A1    2/2000

* cited by examiner

*Primary Examiner*—Mohammed Hasan
(74) *Attorney, Agent, or Firm*—Hodgson Russ LLP

(57) ABSTRACT

The invention relates to a focusing drive (15) having a linear stroke carriage (6) for carrying and moving an optics carrier in the direction of focus, the focusing drive (15) comprising: a focus carrier (1) having at least one linear guidance system (3) having a rail (4) extending in the direction of focus and having at least one carriage (5) movably supported on the rail (4); and a direct drive (2) for moving a piston (10) supported movably in the direction of focus, which piston is in turn joined to the linear stroke carriage (6) of the focusing drive (15), the linear stroke carriage (6) being joined to the at least one carriage (5) of the linear guidance system (3). This focusing drive (15) makes do with few components without linkage elements, and is significantly quieter.

11 Claims, 5 Drawing Sheets

FOCUSING DRIVE

CROSS REFERENCE TO RELATED APPLICATIONS

This application claims priority of German patent application 10 2006 040 797.0 filed Aug. 31, 2006, which is incorporated by reference herein.

FIELD OF THE INVENTION

The present invention relates to a focusing drive having a linear stroke carriage for carrying and moving an optics carrier in a direction of focus.

BACKGROUND OF THE INVENTION

Focusing drives of this kind are utilized, for example, in surgical microscopes of the Assignee for opthalmology, such as the LEICA M501, to move the microscope in the focusing direction in order to adjust the focus. The focusing drive comprises for this purpose a linear stroke carriage that carries the optics carrier (which in this case represents the microscope) and moves it in the focusing direction. An electrical drive is always used in these known focusing drives, which drive always requires an additional linkage to convert the rotary motion of the motor into the desired linear motion. This can involve, for example, a belt drive (e.g. toothed belt) or a gear combination, which move the linear stroke carriage in the focusing direction via a spindle. The motor and spindle are usually arranged next to one another parallel to the focusing direction, so that the focusing drive is correspondingly physically wide.

Greases are used to avoid wear; these help to limit friction as well as noise resulting therefrom.

The occasionally high rotation speeds of the drive motor and thus also of the gearing or linkage, however, produce noise that is usually loud and, in particular when a surgical microscope is being used, is unpleasant and irritating to the user. This noise results on the one hand from the elements themselves and on the other hand from the transfer of sound (especially through the usually thin-walled housing elements).

DC or stepping motors are obtainable exclusively without noise-damping features. Subsequent actions must therefore be taken to diminish noise.

The generally complex design of the known focusing drives, resulting from the aforesaid plurality of components that for the most part are not standard components and thus entail additional outlay for manufacture and assembly, proves to be disadvantageous. The use of ordinary drives (e.g. DC motors) requires additional linkage elements that convert the rotary motion of the motor into the desired linear motion of the focusing drive. Even when they correspond to a standard, these linkage elements require complex connecting structures such as bearing, attachment, and alignment systems, which then turn out to require service when considered over the working life of the product. The need to regrease or realign or readjust various linkage elements in order to obtain the desired functionality already represents a definite disadvantage for the user and the manufacturer.

The aforementioned noise output, which is unpleasant and irritating to the user, requires complex measures such as special bearing systems and casings, application of compounds or linings of housing parts (solid-borne sound), which nevertheless are often not sufficiently effective. This represents a further clear shortcoming of known focusing drives.

SUMMARY OF THE INVENTION

It is therefore an object of the present invention to provide a focusing drive that overcomes the aforesaid disadvantages of the existing art.

The object is achieved by a focusing drive formed in accordance with the present invention.

The focusing drive according to the present invention, which has a linear stroke carriage for carrying and moving an optics carrier in the focusing direction, comprises a focus carrier that is in turn equipped with at least one linear guidance system that comprises a rail extending in the focusing direction and at least one carriage movably supported on the rail. The focusing drive furthermore comprises a direct drive (linear drive) for moving a piston supported movably in the focusing direction, which piston is in turn joined to the linear stroke carriage of the focusing drive, the linear stroke carriage being joined to the at least one carriage of the linear guidance system.

The design according to the present invention eliminates additional linkage elements thanks to the use of a direct drive. The piston of the direct drive is joined directly to the linear stroke carriage of the focusing drive. Additional linkage elements are thus superfluous. At the same time, servicing complexity can be thereby greatly reduced, and a drastic minimization of noise can be achieved.

Because the direct drive can be arranged immediately behind the linear stroke carriage in the focusing direction (viewed from the optics carrier), the result is a slender, physically small unit.

Direct drives are known per se. They are not only much quieter than the drive motors hitherto used, but also obtainable less expensively on the market. They function, in principle, like a pneumatic cylinder. Reference may be made, for example, to the "ACTUATOR LA22" direct drive of LINAK AG, Switzerland. With this model, the maximum drive speed in the focusing direction is 37 mm/s at a maximum linear stroke of 200 mm, with extremely quiet operation. This direct drive comprises a piston, fabricated from steel, that is movable in the focusing direction and can be joined to the linear stroke carriage of a focusing drive. The powerful (max. 400 N) and above all quiet embodiment of a direct or linear drive of this kind requires no noise insulation and no further linkage for conversion into linear motion.

The linear stroke carriage of the focusing drive is joined to at least one carriage of the linear guidance system that is mounted on the focus carrier. The use of at least two linear guidance systems is advantageous. Each linear guidance system comprises a rail that extends in the focusing direction and can be produced, for example, from aluminum. One or more, in particular four, carriages or slides mounted on the rail serve for connection to the linear stroke carriage.

A linear guidance system of this kind requires no lubrication, no maintenance is necessary, and no disruptive abrasion occurs when suitable materials are used.

The combination according to the present invention of a direct drive and linear guidance system(s) thus creates an extremely low-noise focusing drive with no linkage elements, which requires no grease and no elements necessitating alignment or adjustment in the entire focusing drive.

It is advantageous if the direct drive is received at least in part, advantageously entirely, in the focus carrier. A compact design can thereby be obtained.

The narrow and compact design can be made even more space-saving by arranging the direct drive at least in part between at least two linear guidance systems. Solely to enhance comprehension and not to limit generality, it will be assumed hereinafter that exactly two linear guidance systems are used. If the direct drive sits between the two guidance systems, longer guidance systems or rails are necessary; at the same time, stability against tilting is enhanced by the greater contact section or distance.

It is useful in this context if the linear stroke carriage comprises bars (extensions) that proceed parallel to the rails of the linear guidance systems and are joined to one or more carriages (slides) of the linear guidance system. The bars can be embodied in a fashion integrated with the linear stroke carriage, i.e. can constitute rearward extensions of the linear stroke carriage that end up next to the direct drive in the retracted state. A particularly stable and space-saving arrangement is thereby achieved.

Advantageously, the two linear guidance systems are joined nonpositively (force-fittedly) to the focus carrier by means of a screw connection. Positive engagement can be achieved by abutting each of the two linear guidance systems against a correspondingly tolerated edge (running parallel to the linear guidance system) of the focus carrier, and pressing it against that respective edge by means of an, in particular, wedge-shaped positive engagement element such as a wedge gib. This positive engagement prevents shifting of the linear guidance systems resulting from the forces and moments acting on the system (because of the motion of the optics carrier), which would impair function or at least place a large load on the direct drive.

The direct drive of the system can be received in the focus carrier by the fact that a retainer is provided in the focus carrier, which retainer advantageously is received nonpositively via a screw connection and abuts against two edges of the focus carrier so that, here again, any possible shifting can be avoided. The direct drive is clamped nonpositively in the retainer, for example by the fact that the retainer comprises a slot that is closed by a further screw connection. The retainer comprises a cutout through which the piston or piston extension of the direct drive engages.

Lastly, the linear stroke carriage can comprise at least one stop that, when an initial or final position of the linear stroke carriage is reached, interacts with a corresponding limit switch arranged in the focus carrier in order to prevent any further driving of the linear stroke carriage therebeyond. It is advantageous to provide a limit switch and corresponding stop at least in the completely retracted position, with the result that the electronics provided for the direct drive are switched off in the completely retracted position.

The invention and its advantages will be explained in further detail below by way of exemplifying embodiments that are explained herebelow and illustrated in the Figures.

Be it noted that the features of the invention that are discussed above and those yet to be discussed are usable not only in the combination indicated here but also in other combinations or in isolation, without leaving the context of the invention.

DETAILED DESCRIPTION OF THE INVENTION

Figure 1:
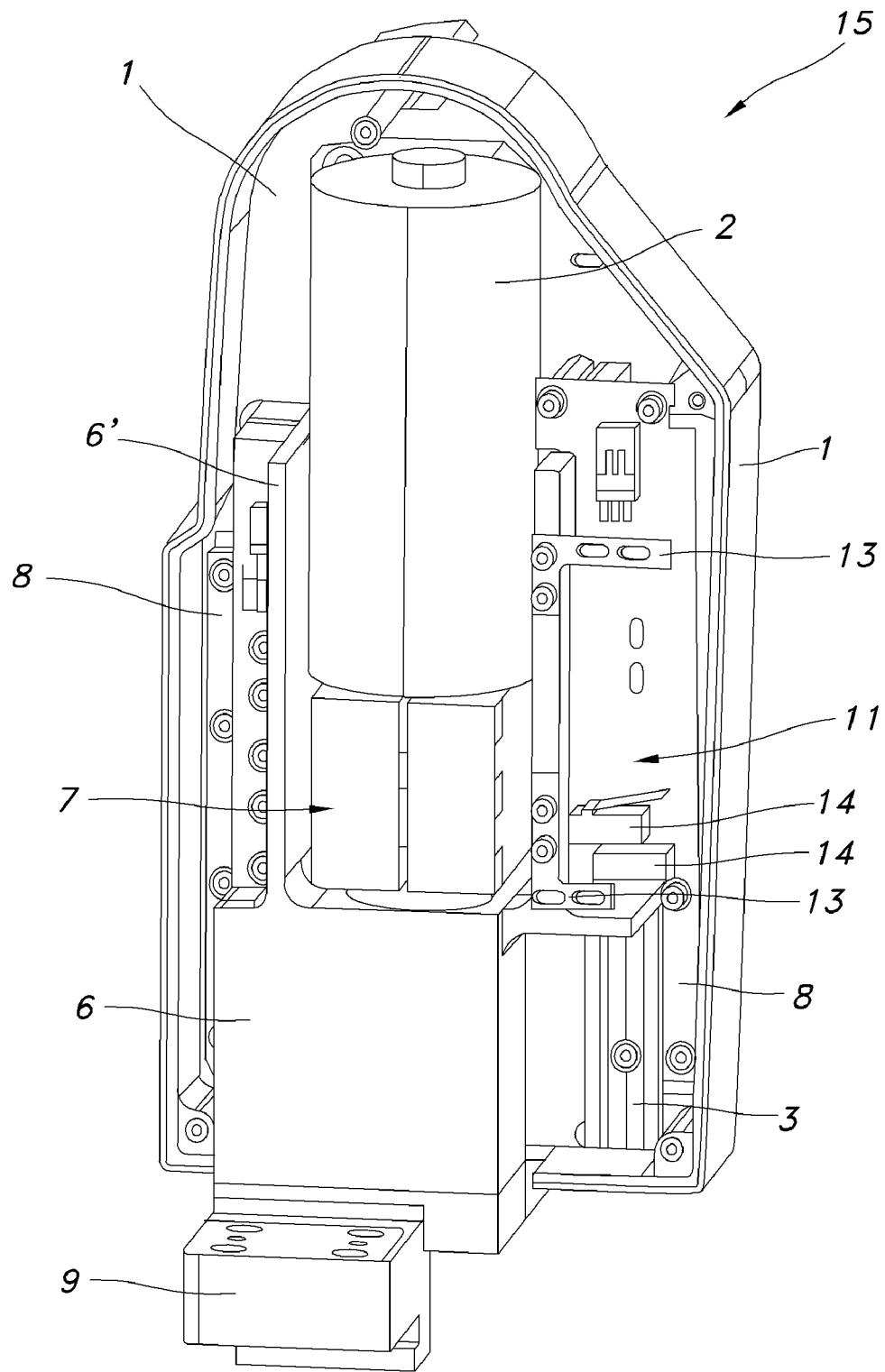
FIG. 1 shows an embodiment of a focusing drive according to the present invention, without a housing cover and without attached cables.

In FIGS. 1 to 5, identical elements are labeled with identical reference characters. Unless explicitly indicated otherwise, the explanations below apply in identical fashion to the various depictions in FIGS. 1 to 5.

FIG. 1 shows a complete focusing drive 15 such as the one that can be used, for example, in a surgical microscope to adjust the focus of the microscope. A view without the housing cover is shown, and the current-carrying cables for direct drive 2 or electronics board 11 are not shown. In this exemplifying embodiment, direct drive 2 is arranged entirely in focus carrier 1. Focus carrier 1 constitutes the supporting element for the drive system. The housing of focusing drive 15 can be joined to focus carrier 1 or integrated thereinto.

Mounted to the left and to the right of direct drive 2 is a respective linear guidance system 3 (cf. also FIG. 3), each linear guidance system 3 comprising a rail 4 and (in this exemplifying embodiment) four carriages 5. Each linear guidance system 3 is joined nonpositively to focus carrier 1 by means of a screw connection.

Figure 2:
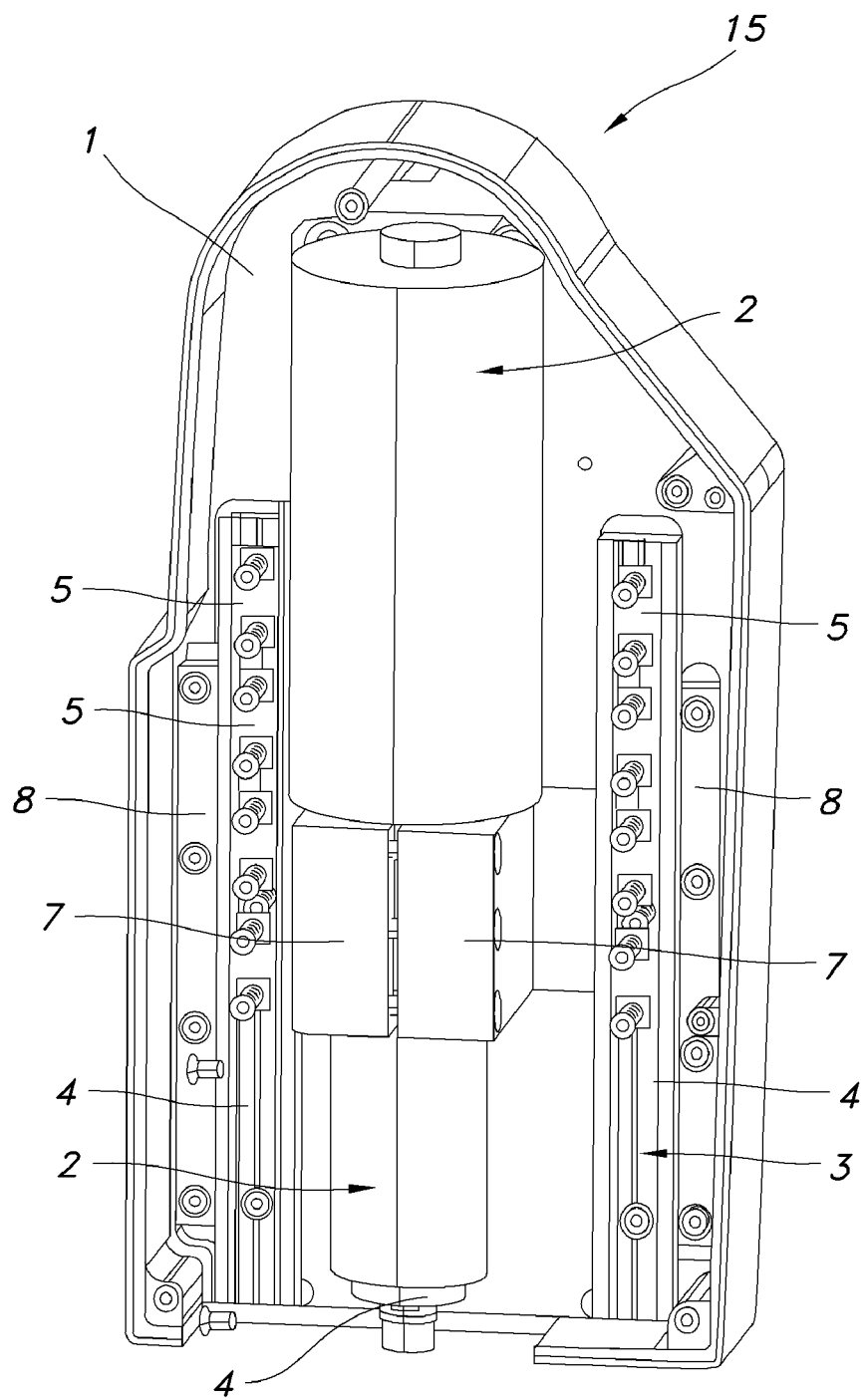
FIG. 2 is a depiction like FIG. 1 but without a linear stroke carriage, so that the linear guidance systems are visible.
Figure 3:
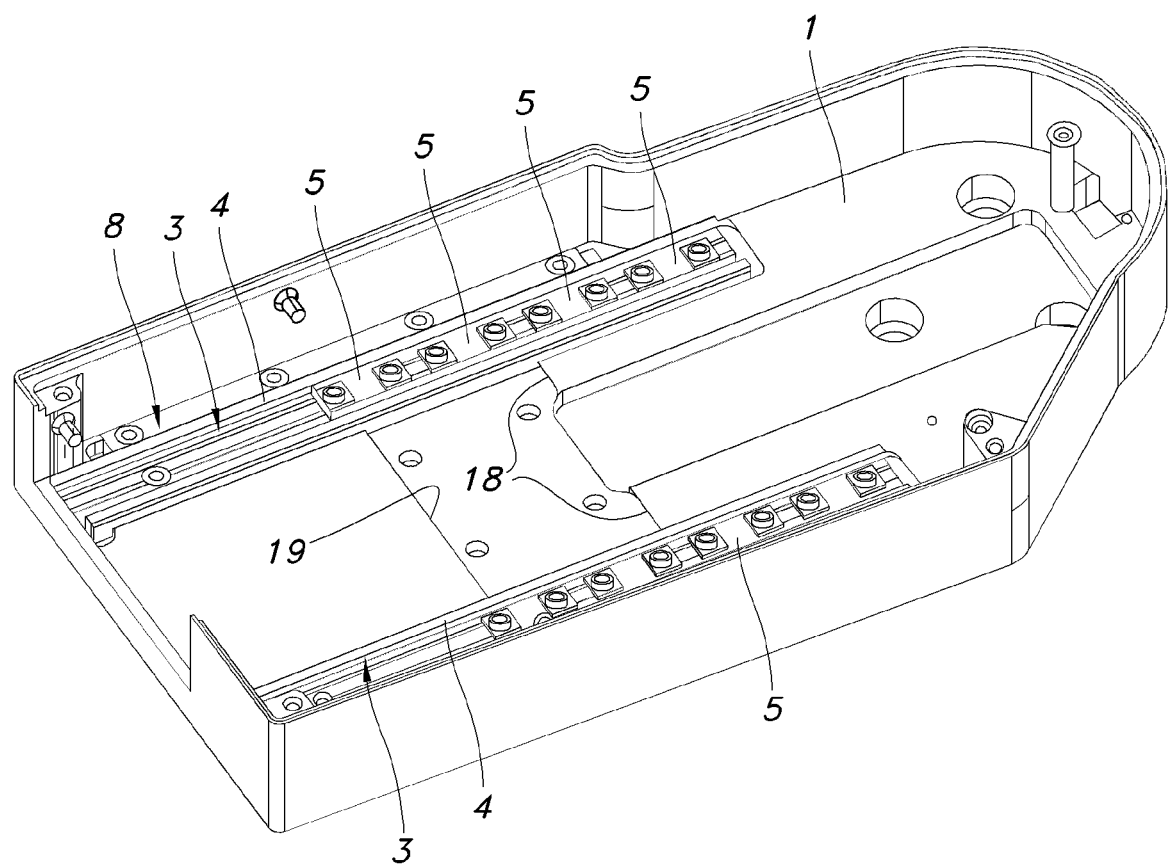
FIG. 3 shows the linear guidance systems in the focus carrier, as a detail of FIG. 2.
Figure 4:
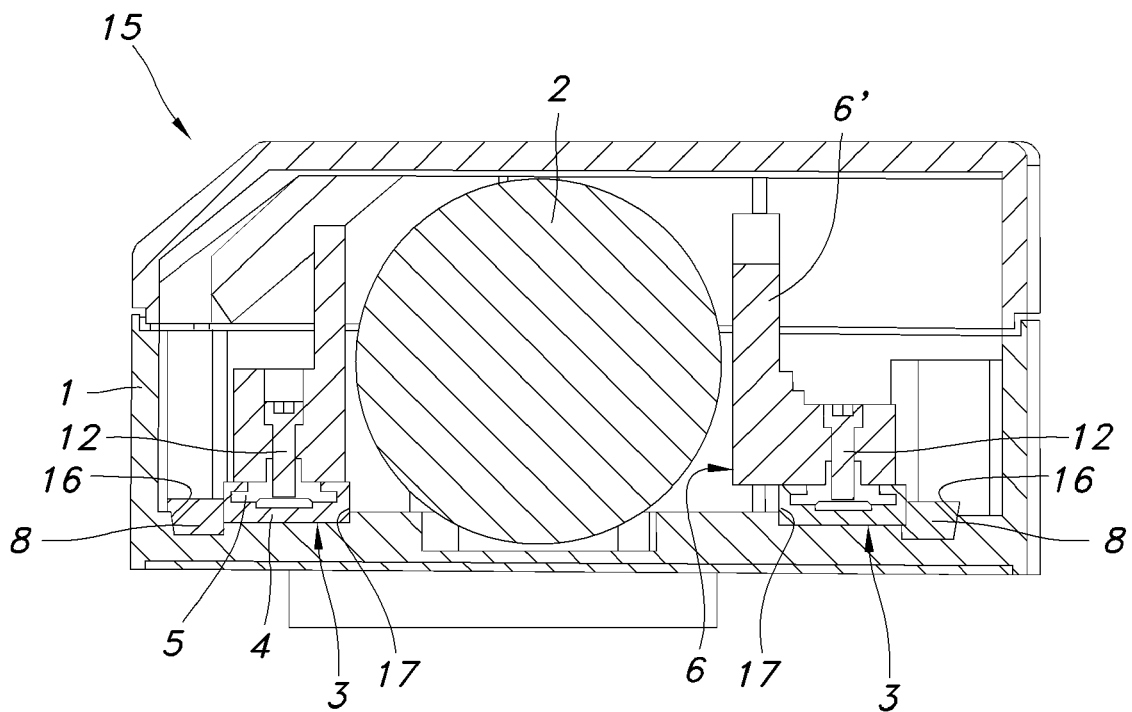
FIG. 4 shows the focusing drive in cross section.

Evident from FIGS. 1 to 5, in particular FIG. 4, are the profile and arrangement of a wedge-shaped positive-engagement element (here a wedge gib 8) with which a positive engagement is achieved between a linear guidance system 3 and focus carrier 1 by the fact that wedge gib 8 abuts against a correspondingly tolerated surface 16 of focus carrier 1 running parallel to linear guidance system 3 and the focusing direction. Linear guidance system 3 is thereby pressed against an opposing surface 17 of focus carrier 1. This positive engagement prevents any shifting of linear guidance systems 3 as a result of the forces and moments acting on focusing drive 15 caused by the weight and motion of linear stroke carriage 6, interface 9 to optics carrier, and the optics carrier itself (microscope; not depicted). These forces and moments that occur are transferred in this fashion to focus carrier 1 and to the housing, without stressing direct drive 2.

Figure 5:
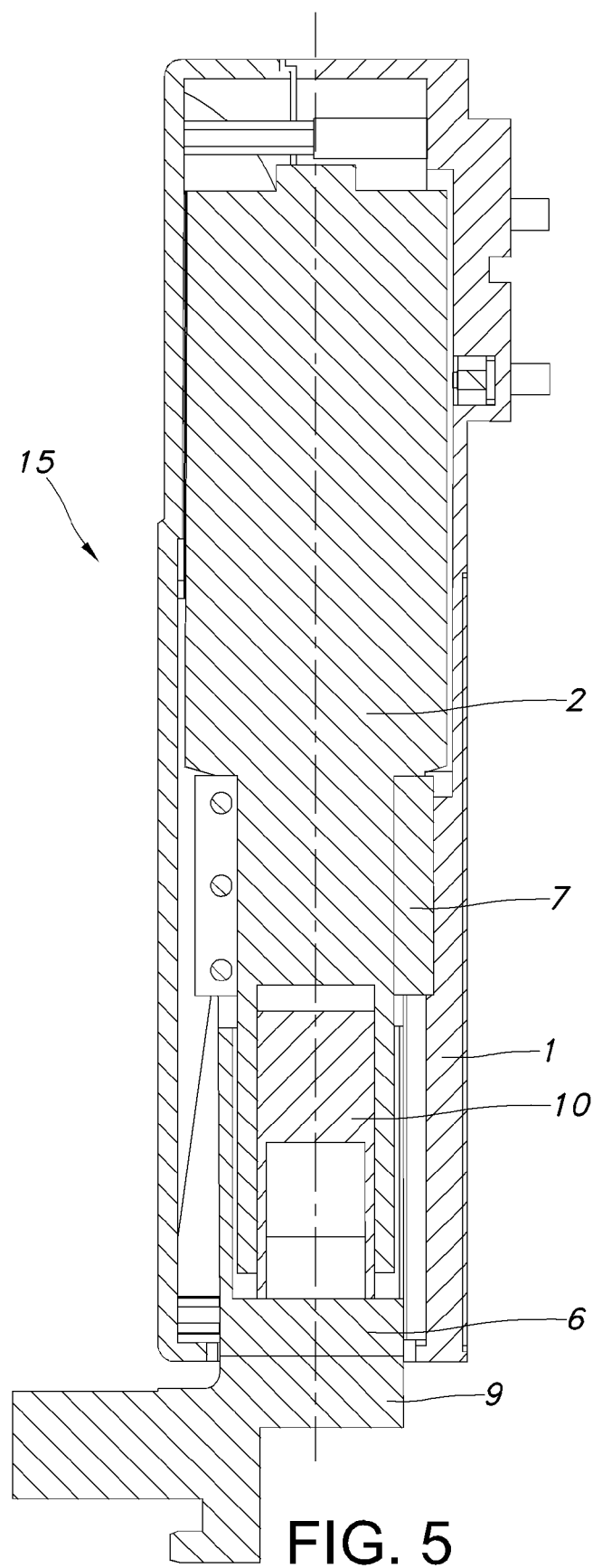
FIG. 5 shows the focusing drive in longitudinal section.

The shape and arrangement of a retainer 7 for direct drive 2 may be inferred from FIGS. 1, 2, and 5. Retainer 7 is received nonpositively, likewise via a screw connection, in focus carrier 1, and once again abuts against two surfaces 18 and 19 of focus carrier 1 in order, here again, to avoid shifts resulting from the forces and moments that are active. Here the surface 18 and 19 proceed perpendicularly (i.e. at a 90° angle) to the focusing direction and parallel to one another. Direct drive 2 is in turn clamped nonpositively in retainer 7 by the fact that retainer 7 exhibits a slot that can be closed by a screw connection (cf. FIG. 5). Piston 10 and piston extension of direct drive 2 engage through retainer 7.

FIGS. 2 and 5 show the movable piston 10 of direct drive 2 that can be shifted in defined fashion in the focusing direction (from bottom to top in the drawing plane of FIG. 2) by direct drive 2. When direct drive 2 is acted upon by a corresponding voltage, piston 10 moves; its linear stroke motion can be controlled by means of an electronics board 11 depicted in FIG. 1, and can be limited in practice by means of limit switches 14. Linear stroke carriage 6 advantageously has for this purpose, as depicted in FIG. 1, two stops 13 that come into contact, at the beginning and end of the desired linear stroke motion, with corresponding limit switches 14 on electronics board 11, thereby interrupting the drive.

Linear stroke carriage 6 of focusing drive 15 is nonpositively joined to the movable piston 10 of direct drive 2 and is thus also moved by the linear stroke motion. For guidance of linear stroke carriage 6, the latter is nonpositively joined to the two linear guidance systems 3 by the fact that the four respective carriages 5 that are mounted movably on rail 4 of a linear guidance system are joined to linear stroke carriage 6 or to its bar 6' extending out behind. Reference may be made here in particular to FIGS. 1 and 4. Connection 12 between a linear stroke carriage bar 6' and a carriage 5 of linear guidance system 3 is particularly visible in FIG. 4.

Lastly, interface 9 to the microscope or optics carrier is nonpositively attached to linear stroke carriage 6 so that the microscope (not depicted) present on said carrier can be moved linearly in the focusing direction. Linear stroke carriage 6 and the interface to optics carrier 9 can of course be embodied integrally.

FIGS. 2 and 3 depict linear guidance systems 3 each made up of a rail 4 and a carriage 5 present thereon, each carriage comprising two screws for attachment to linear stroke carriage 6.

Focusing drive 15 depicted in FIGS. 1 to 5 represents a simple, stable, and reliable configuration that is extremely low-noise. The number of components of focusing drive 15 is drastically reduced as compared with the existing art. This greatly reduces assembly complexity. Ease of assembly increases sharply, since no alignment is necessary. Greases can be omitted from the entire focusing drive 15. Linear guidance systems 3 are maintenance-free and exhibit no abrasion in long-term testing. Direct drive 2 eliminates complex linkage elements. Previous expensive actions after the fact for noise insulation are entirely superfluous.

Other embodiments of focusing drive 15 according to the present invention are apparent to one skilled in the art, for example those having only one linear guidance system 3 (in which case the aforementioned forces and moments that occur must be suitably compensated for) or having more than two linear guidance systems. The number of carriages, or of screws present on the carriages, is of course variable in accordance with the length of the linear stroke motion and the stability required.

PARTS LIST

| | |
|---|---|
| 1 | Focus carrier |
| 2 | Direct drive |
| 3 | Linear guidance system |
| 4 | Rail of linear guidance system |
| 5 | Carriage of linear guidance system |
| 6 | Linear stroke carriage |
| 6' | Bar of linear stroke carriage |
| 7 | Retainer |
| 8 | Positive engagement element, wedge gib |
| 9 | Interface to optics carrier |
| 10 | Piston |
| 11 | Electronics board |
| 12 | Connection |
| 13 | Stop |
| 14 | Limit switch |
| 15 | Focusing drive |
| 16 | Surface of focus carrier |
| 17 | Surface of focus carrier |
| 18 | Surface of focus carrier |
| 19 | Surface of focus carrier |

What is claimed is:

1. A focusing drive for displacing an optics carrier along a focusing direction, the focusing drive comprising:
   a linear stroke carriage for carrying an optics carrier;
   a focus carrier including at least one linear guidance system having a rail extending in the focusing direction and having at least one carriage movably supported on the rail for travel along the rail; and
   a direct drive including a piston supported for movement in the focusing direction;
   wherein the piston is joined to the linear stroke carriage, and the linear stroke carriage is joined to the at least one carriage of the at least one linear guidance system.

2. The focusing drive according to claim 1, wherein the direct drive is at least in part received in the focus carrier.

3. The focusing drive according to claim 1, wherein a wedge-shaped positive engagement element is provided between the linear guidance system and a surface of the focus carrier extending parallel to the focusing direction.

4. The focusing drive according to claim 1, wherein the direct drive is braced in the focus carrier by a retainer.

5. The focusing drive according to claim 4, wherein the retainer abuts against two parallel surfaces of the focus carrier extending perpendicular to the focusing direction.

6. The focusing drive according to claim 1, wherein the at least one linear guidance system includes two linear guidance systems.

7. The focusing drive according to claim 1, wherein the at least one carriage includes a plurality of carriages.

8. The focusing drive according to claim 7, wherein the plurality of carriages is four carriages.

9. The focusing drive according to claim 6, wherein the direct drive is arranged at least in part between the two linear guidance systems.

10. The focusing drive according to claim 1, wherein the linear stroke carriage includes at least one bar extending parallel to the rail of the at least one linear guidance system, the bar being joined to the at least one carriage of the linear guidance system.

11. The focusing drive according to claim 1, further comprising a limit switch arranged in the focus carrier and operable to switch off the direct drive, wherein the linear stroke carriage includes at least one stop that interacts with the limit switch when an initial or a final position of the linear stroke carriage is reached in order to prevent further driving of the linear stroke carriage.

* * * * *